United States Patent
Danielson et al.

(10) Patent No.: US 11,106,391 B2
(45) Date of Patent: Aug. 31, 2021

(54) MANAGING A MEMORY SYSTEM INCLUDING MEMORY DEVICES WITH DIFFERENT CHARACTERISTICS

(71) Applicant: Micron Technology, Inc., Boise, ID (US)

(72) Inventors: Michael B. Danielson, Georgetown, TX (US); Paul A. Suhler, Austin, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/962,719

(22) Filed: Apr. 25, 2018

(65) Prior Publication Data
US 2019/0332317 A1    Oct. 31, 2019

(51) Int. Cl.
| | |
|---|---|
| G06F 3/06 | (2006.01) |
| G06F 16/11 | (2019.01) |
| G06F 16/174 | (2019.01) |
| G11C 16/26 | (2006.01) |
| G11C 29/52 | (2006.01) |
| G11C 16/04 | (2006.01) |
| G11C 16/10 | (2006.01) |
| G06F 11/10 | (2006.01) |

(52) U.S. Cl.
CPC .......... *G06F 3/0659* (2013.01); *G06F 3/0604* (2013.01); *G06F 3/0653* (2013.01); *G06F 3/0688* (2013.01)

(58) Field of Classification Search
CPC .... G06F 3/0659; G06F 3/0604; G06F 3/0653; G06F 3/0688; G06F 3/0631; G06F 3/0685; G06F 3/0607
See application file for complete search history.

(56) References Cited

U.S. PATENT DOCUMENTS

| | | | |
|---|---|---|---|
| 7,568,075 B2 * | 7/2009 | Fujibayashi | G06F 3/0613 711/154 |
| 9,529,543 B1 * | 12/2016 | Chinnakkonda Vidyapoornachary | G11C 5/04 |
| 2005/0235131 A1 | 10/2005 | Ware | |
| 2010/0153616 A1 | 6/2010 | Garratt | |
| 2010/0169541 A1 | 7/2010 | Freikom | |
| 2011/0173378 A1 | 7/2011 | Filor et al. | |
| 2012/0117304 A1 * | 5/2012 | Worthington | G06F 12/0223 711/103 |
| 2016/0092140 A1 * | 3/2016 | Santaniello | G06F 3/0611 709/224 |

(Continued)

OTHER PUBLICATIONS

International Search Report and Written Opinion of the International Searching Authority, International Application No. PCT/US2019/028790, dated Sep. 16, 2019, 8 pages.

*Primary Examiner* — Nanci N Wong
*Assistant Examiner* — Tong B. Vo
(74) *Attorney, Agent, or Firm* — Lowenstein Sandler LLP (57) ABSTRACT

A first set of characteristics corresponding to a first memory device and a second set of characteristics corresponding to a second memory device are received. A first usage threshold for the first memory device based on the first set of characteristics and a second usage threshold for the second memory device based on the second set of characteristics are determined. Data is stored at the first memory device or the second memory device based on the first usage threshold for the first memory device and the second usage threshold for the second memory device.

20 Claims, 6 Drawing Sheets

(56) References Cited

U.S. PATENT DOCUMENTS

2018/0357013 A1\* 12/2018 Shi ..................... G06F 12/0246
2019/0102083 A1\* 4/2019 Dusija .................. G06F 3/0679

\* cited by examiner

MANAGING A MEMORY SYSTEM INCLUDING MEMORY DEVICES WITH DIFFERENT CHARACTERISTICS

TECHNICAL FIELD

Embodiments of the disclosure relate generally to memory systems, and more specifically, relate to managing a memory system including memory devices with different characteristics.

BACKGROUND

A memory system can be a storage system, such as a solid-state drive (SSD), and can include one or more memory devices that store data. A memory system can include memory devices such as non-volatile memory devices and volatile memory devices. In general, a host system can utilize a memory system to store data at the memory devices of the memory system and to retrieve data from the memory devices of the memory system.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure are directed to managing a memory system that includes memory devices with different characteristics. An example of a memory system is a storage system, such as a solid-state drive (SSD). In some embodiments, the memory system is a hybrid memory/storage system. In general, a host system can utilize a memory system that includes one or more memory devices. The host system can provide data to be stored at the memory system and can request data to be retrieved from the memory system.

The memory system can include multiple memory devices that can store data from the host system. Each memory device can include a different type of media. Examples of media of a memory device include, but are not limited to, a crosspoint array of non-volatile memory and flash based memory such as single-level cell (SLC) memory, triple-level cell (TLC) memory, and quad-level cell (QLC) memory. The characteristics of different types of media can be different from one media type to another media type. One example of a characteristic associated with a memory device is data density. Data density corresponds to an amount of data (e.g., bits of data) that can be stored per memory cell of a memory device. Using the example of a flash based memory, a quad-level cell (QLC) can store four bits of data while a single-level cell (SLC) can store one bit of data. Accordingly, a memory device including QLC memory cells will have a higher data density than a memory device including SLC memory cells. Another example of a characteristic of a memory device is access speed. The access speed corresponds to an amount of time for the memory device to access data stored at the memory device.

Other characteristics of a memory device can be associated with the endurance of the memory device to store data. When data is written to and/or erased from a memory cell of a memory device, the memory cell can be damaged. As the number of write operations and/or erase operations performed on a memory cell increases, the probability that the data stored at the memory cell including an error increases as the memory cell is increasingly damaged. A characteristic associated with the endurance of the memory device is the number of write operations or a number of program/erase operations performed on a memory cell of the memory device. If a threshold number of write operations performed on the memory cell is exceeded, then data can no longer be reliably stored at the memory cell as the data can include a large number of errors that cannot be corrected. Different media types can also have difference endurances for storing data. For example, a first media type can have a threshold of 1,000,000 write operations, while a second media type can have a threshold of 2,000,000 write operations. Accordingly, the endurance of the first media type to store data is less than the endurance of the second media type to store data.

Another characteristic associated with the endurance of a memory device to store data is the total bytes written to a memory cell of the memory device. Similar to the number of write operations, as new data is written to the same memory cell of the memory device the memory cell is damaged and the probability that data stored at the memory cell includes an error increases. If the number of total bytes written to the memory cell of the memory device exceeds a threshold number of total bytes, then the memory cell can no longer reliably store data.

A conventional memory system can include memory devices having a single media type. Accordingly, the memory devices in the conventional memory system have a single set of characteristics (e.g., data density, access speed, endurance, etc.) As a result, the conventional memory system can manage the memory device based on the single set of characteristics. When a host system provides data to a memory system for storage, the host system can have desired characteristics for the memory device that is to store the data. The desired characteristics for the memory device can be dependent on the characteristics of the data and can vary from one type of data to another type of data. For example, for data files having a large amount of data a desired characteristic of the memory device can be a high data density.

Generally, in order to obtain the different desired characteristics of memory devices, multiple conventional memory systems having different media types and associated characteristics can be used with a host system. For example, a host system can be coupled to a first conventional memory system having a first media type with a high data density, a second conventional memory system having a second media type with a high access speed, and a third conventional memory system having a third media type with a high endurance. However, using multiple memory systems to achieve the different desired characteristics for the storage of data is costly and inefficient as the host system would utilize additional connections to each of the different memory systems.

Aspects of the present disclosure address the above and other deficiencies by having a memory system that includes multiple memory devices having different media types with different sets of characteristics. Such a memory system can reduce costs by providing memory devices with different sets of characteristics in a single memory system as opposed to using multiple memory systems. Furthermore, the use of a single memory system having multiple memory devices with different media types can result in a reduced power consumption versus the use of multiple memory systems as a single memory system can utilize less power as opposed to multiple different memory systems.

However, as previously discussed, memory devices having different media types can have different endurances and different respective threshold for storing data at the memory devices. The data can be stored at the memory devices based on the determined usage thresholds. For example, if a first memory device of the memory system is at or near a first usage threshold that indicates that the first memory device is at or near a point where the first memory device can no longer reliably store data, then data can be stored at another memory device of the memory system. By providing data to the different memory devices of the memory system based on different determined usage thresholds, the wear (e.g., number of operations performed on a memory device and/or an amount of data written to the memory device) on the multiple memory devices of the memory system can be more evenly distributed, preventing the premature failure of a particular memory device of a memory system relative to the other memory devices of the memory system.

Figure 1:
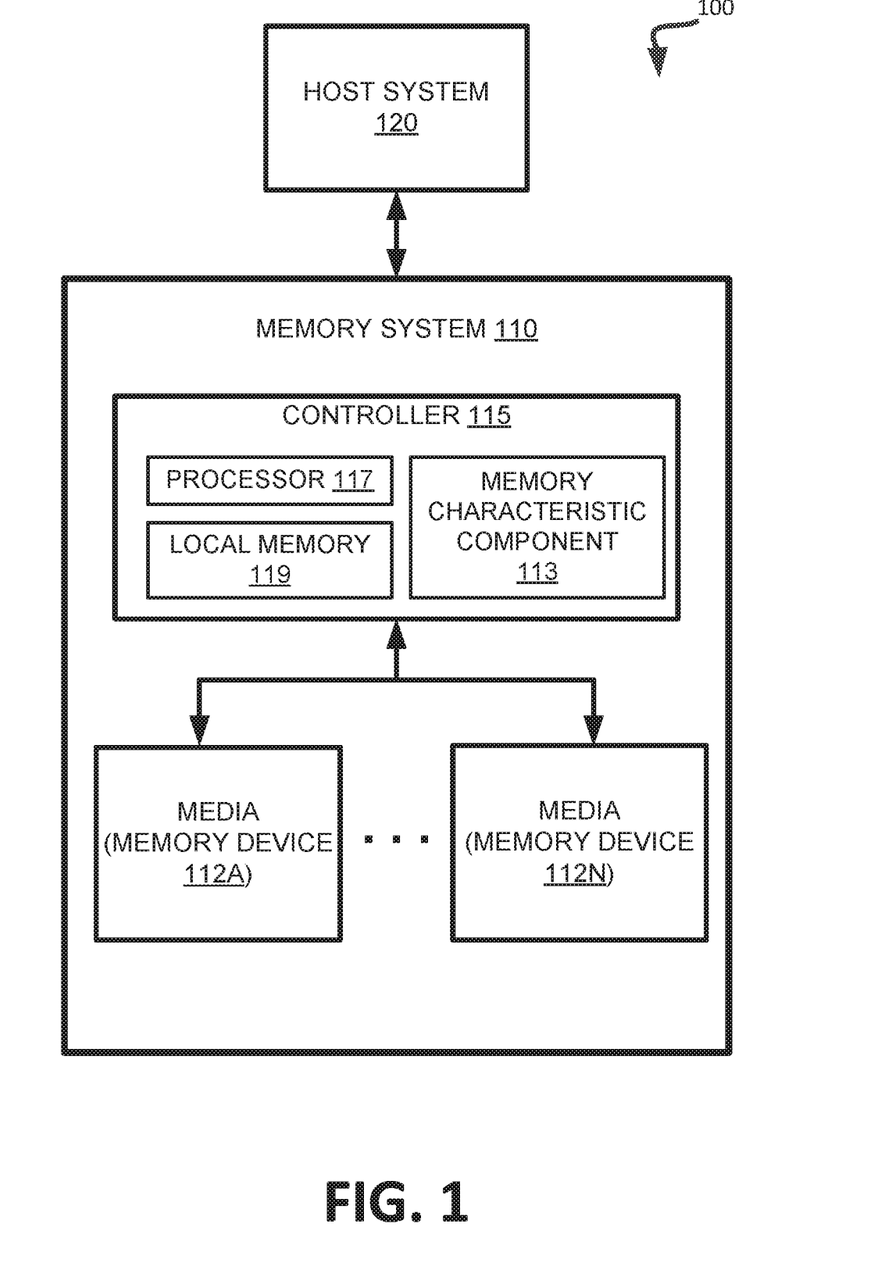
FIG. 1 illustrates an example computing environment that includes a memory system in accordance with some embodiments of the present disclosure.

FIG. 1 illustrates an example computing environment 100 that includes a memory system 110 in accordance with some implementations of the present disclosure. The memory system 110 can include media, such as memory devices 112A to 112N. The memory devices 112A to 112N can be volatile memory devices, non-volatile memory devices, or a combination of such. In some embodiments, the memory system is a storage system. An example of a storage system is a SSD. In general, the computing environment 100 can include a host system 120 that uses the memory system 110. In some implementations, the host system 120 can write data to the memory system 110 and read data from the memory system 110. In some embodiments, the memory system 110 is a hybrid memory/storage system.

The host system 120 can be a computing device such as a desktop computer, laptop computer, network server, mobile device, or such computing device that includes a memory and a processing device. The host system 120 can include or be coupled to the memory system 110 so that the host system 120 can read data from or write data to the memory system 110. The host system 120 can be coupled to the memory system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory system 110. The host system 120 can further utilize an NVM Express (NVMe) interface to access the memory devices 112A to 112N when the memory system 110 is coupled with the host system 120 by the PCIe interface. The physical host interface can provide an interface for passing control, address, data, and other signals between the memory system 110 and the host system 120.

The memory devices 112A to 112N can include any combination of the different types of non-volatile memory devices and/or volatile memory devices. An example of non-volatile memory devices includes a negative-and (NAND) type flash memory. Each of the memory devices 112A to 112N can include one or more arrays of memory cells such as single level cells (SLCs) or multi-level cells (MLCs) (e.g., triple level cells (TLCs) or quad-level cells (QLCs)). In some implementations, a particular memory device can include both an SLC portion and a MLC portion of memory cells. Each of the memory cells can store bits of data (e.g., data blocks) used by the host system 120. Although non-volatile memory devices such as NAND type flash memory are described, the memory devices 112A to 112N can be based on any other type of memory such as a volatile memory. In some implementations, the memory devices 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross point non-volatile memory can perform a write in-place operation, where a non-volatile memory cell can be programmed without the non-volatile memory cell being previously erased. Furthermore, the memory cells of the memory devices 112A to 112N can be grouped as memory pages or data blocks that can refer to a unit of the memory device used to store data.

The controller 115 can communicate with the memory devices 112A to 112N to perform operations such as reading data, writing data, or erasing data at the memory devices 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory system 110, including handling communications between the memory system 110 and the host system 120. In some embodiments, the local memory 119 can include memory registers storing memory pointers, fetched data, etc. The local memory 119 can also include read-only memory (ROM) for storing micro-code. While the example memory system 110 in FIG. 1 has been illustrated as including the controller 115, in another embodiment of the present disclosure, a memory system 110 may not include a controller 115, and may instead rely upon external control (e.g., provided by an external host, or by a processor or controller separate from the memory system).

In general, the controller 115 can receive commands or operations from the host system 120 and can convert the commands or operations into instructions or appropriate commands to achieve the desired access to the memory devices 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory devices 112A to 112N. The controller 115 can further include host interface circuitry to communicate with the host system 120 via the physical host interface. The host interface circuitry can convert the commands received from the host system into command instructions to access the memory devices 112A to 112N as well as convert responses associated with the memory devices 112A to 112N into information for the host system 120.

The memory system 110 includes a memory characteristic component 113 that can be used to store data at a particular memory device based on a corresponding usage threshold. In some embodiments, the controller 115 includes at least a portion of the memory characteristic component 113. The memory characteristic component 113 can receive sets of characteristics associated with media devices 112A-N of the memory system 110. The memory characteristic component 113 can determine usage thresholds for each of the memory devices 112A-N based on the sets of characteristics. The memory characteristic component 113 can store data at memory devices 112A-N based on the determined usage thresholds. Further details with regards to the operations of the memory characteristic component 113 are described below.

The memory system 110 can also include additional circuitry or components that are not illustrated. In some implementations, the memory system 110 can include a cache or buffer (e.g., DRAM) and address circuitry (e.g., a row decoder and a column decoder) that can receive an address from the controller 115 and decode the address to access the memory devices 112A to 112N.

Figure 2:
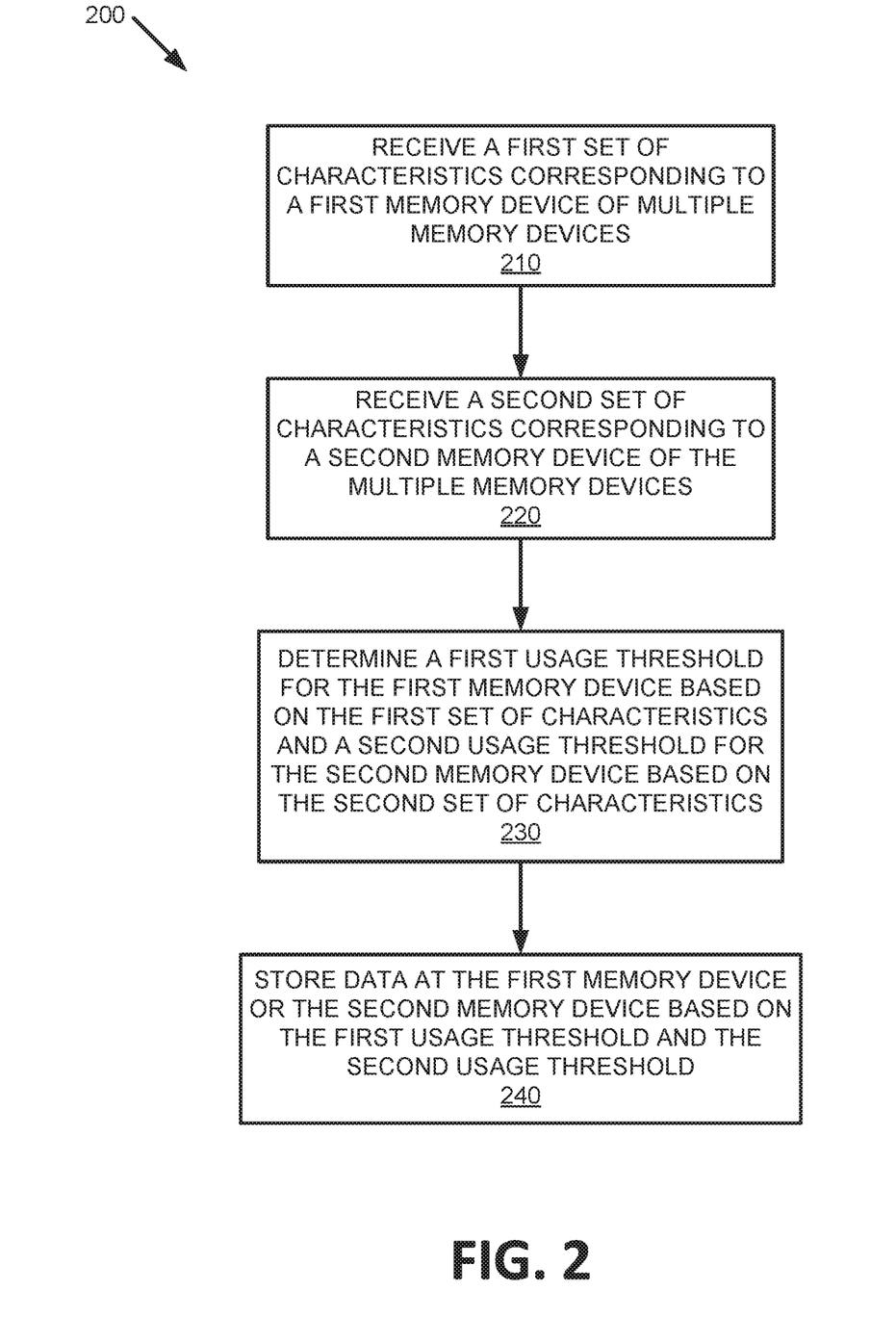
FIG. 2 is a flow diagram of an example method to store data at a memory device based on an associated usage threshold in accordance with some embodiments of the present disclosure.

FIG. 2 is a flow diagram of an example method 200 to store data at a memory device based on an associated usage threshold, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the memory characteristic component 113 of FIG. 1.

At block 210, a first set of characteristics that correspond to a first memory device of a memory system having multiple memory devices is received. Examples of characteristics that can be included in the set of characteristics can include, but are not limited to, data density, access speed, and an indication of the endurance of the memory device to store data. At block 220, a second set of characteristics that correspond to a second memory device of the memory system is received. In one embodiment, the first and second sets of characteristics are received in response to a request for sets of characteristics for the memory devices of the memory system. In an example, a host system can transmit the request for sets of characteristics for each memory device of the memory system. In response, the memory system can provide the sets of characteristics for each of the devices of the memory system to the host system. In some embodiments, the first memory device can be different than the second memory device and the endurance of the first memory device to store data can be different than the endurance for the second memory device to store data. In one embodiment, the first memory device can be a flash based memory and the second memory device can be a non-flash based memory. For example, the first memory device can include a first media type, such as a flash based memory, while the second memory device can include a second media type, such as a crosspoint array memory. In the present example, the memory device including flash based memory can have a first endurance to store data that is different than a second endurance to store data of the second memory device including the crosspoint array memory. Although flash based memory and crosspoint array memory are described, any type of media can be used in the memory devices.

At block 230, a first usage threshold is determined for the first memory device based on the first set of characteristics received at block 220 and a second usage threshold is determined for the second memory device based on the second set of characteristics received at block 220. In embodiments, the first usage threshold can correspond to an endurance of the first memory device to store data and the second usage threshold corresponds to an endurance for the second memory device to store data. In one embodiment, the first usage threshold and the second usage threshold can correspond to the amount of data that can be written to a memory cell of a corresponding memory device before the memory cell can be considered unreliable to store data. For example, the first usage threshold can correspond to 1,000,000 total bytes that can be written to a memory cell of the first memory device and the second usage threshold can correspond to 1,500,000 total bytes that can be written to a memory cell of the second memory device. In some embodiments, the first usage threshold and the second usage threshold can correspond to a number of write operations that can be performed on a memory cell of a corresponding memory device before the memory cell can be considered unreliable to store data. For example, the first usage threshold can correspond to 500,000 write operations that can be performed on a memory cell of the first memory device and the second usage threshold can correspond to 1,000,000 write operations that can be performed on a memory cell of the second memory device.

In embodiments, multiple usage thresholds can be assigned to a memory device of the memory system. The multiple usage thresholds can be based on the endurance of the memory device to store data. For example, a first memory device can have an associated endurance of 1,000,000 total bytes written to a memory cell of the first memory device, at which point the first memory device can no longer store data. In one embodiment, the multiple usage thresholds can be a portion, such as a percentage, of the endurance of the first memory device to store data or the endurance of the first memory device to store data. For example, the first memory device can have one usage threshold corresponding to 900,000 total bytes written to a memory cell of the first memory device and another usage threshold corresponding to 1,000,000 total bytes written to the memory cell of the first memory device. In embodiments, the first usage threshold and second usage threshold can be determined based on a received input from a host system. In other embodiments, the first usage threshold and the second usage threshold may be based on a portion, such as a percentage, of the endurance of the first memory device and the second memory device to reliably store data. For example, if a memory cell of a memory device can have 1,000,000 total bytes written to the memory cell before the memory cell can no longer reliably store data, then the usage threshold for the memory device can be 900,000 total bytes written (e.g., 90%) to a memory cell of the memory device.

At block 240, data is stored at the first memory device of the memory system or the second memory device of the memory system based on the first usage threshold and the second usage threshold. The data can be received from a host system for storage by the memory system. In one embodiment, data can be stored on a memory device having a higher usage threshold. For example, if the first memory device has a usage threshold of 500,000 write operations and the second memory device has a usage threshold of 1,000,000 write operations, then the data can be stored at the second memory device having the higher usage threshold. Further details with regards storing data at a memory device of the memory system based on associated usage thresholds are described below.

Figure 3:
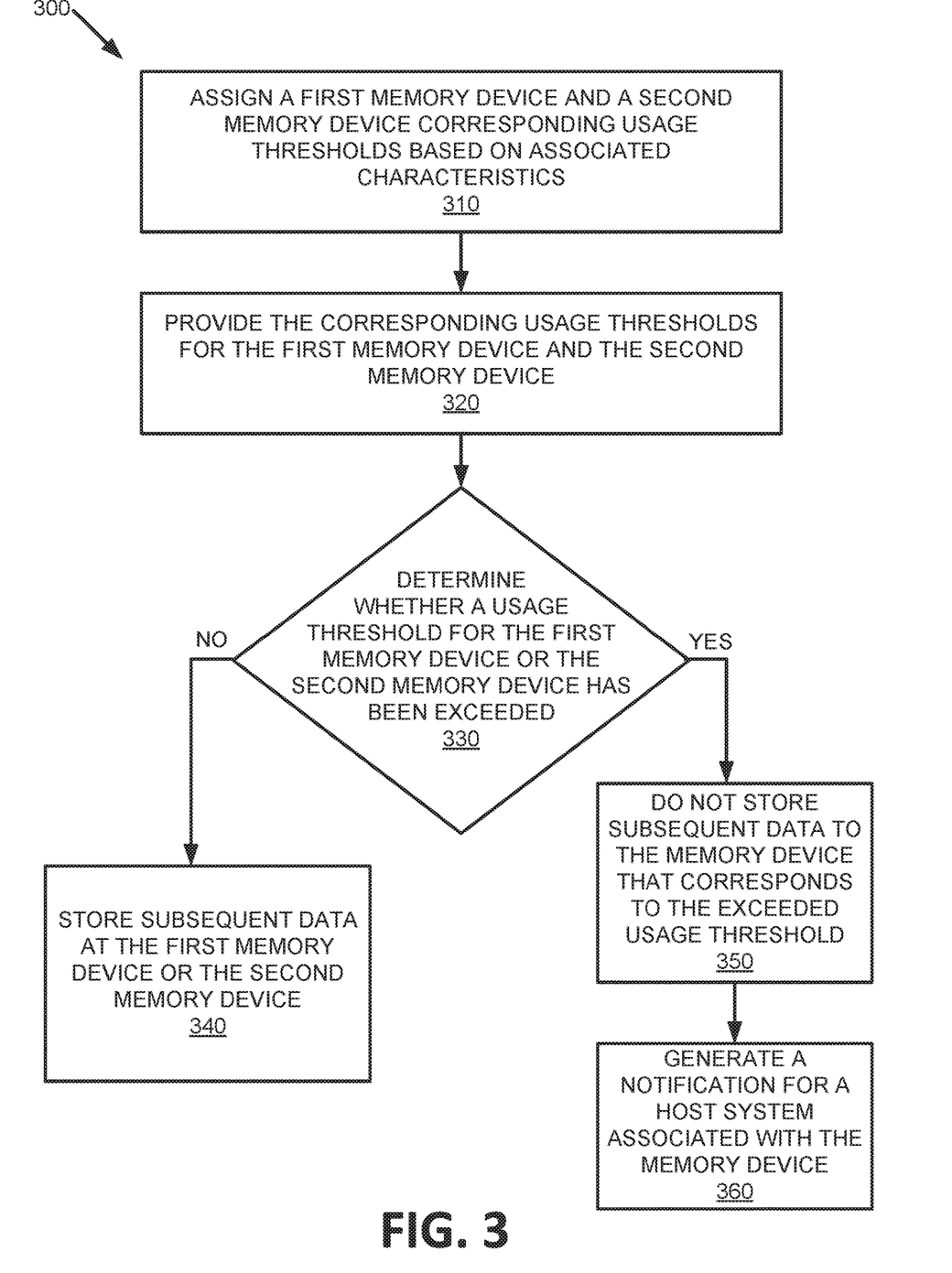
FIG. 3 is a flow diagram of an example method to store data at a memory device of a memory system based on an associated usage threshold in accordance with some embodiments of the present disclosure.

FIG. 3 is a flow diagram of an example method 300 to store data at a memory device of a memory system based on an associated usage threshold, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the memory characteristic component 113 of FIG. 1.

At block 310, a first memory device and a second memory device are assigned corresponding usage thresholds based on associated characteristics, as previously discussed. At block 320, the corresponding usage thresholds for the first memory device and the second memory device are provided. In one embodiment, the corresponding usage thresholds for the first memory device and the second memory device can be provided to a controller of the memory system. In embodiments, providing the corresponding usage thresholds for the first memory device and the second memory device can cause the monitoring of the number of operations being performed on the memory devices of the memory system. For example, upon receipt of the corresponding usage thresholds, the total number of bytes written to memory cells of the first memory device and second memory device and/or the total number of write operations performed on the memory cells of the first memory device and the second memory device are monitored.

At block 330, a determination is made as to whether a corresponding usage threshold of the first memory device or the second memory device has been exceeded. For purposes of the present disclosure, a usage threshold can be exceeded when a value is greater than or equal to the usage threshold. For example, if the first usage threshold for the first memory device is 1,000,000 total bytes written to a memory cell of the first memory device and a memory cell of the first memory device has had 1,000,000 total bytes written to the memory cell, then the first usage threshold has been exceeded. If a usage threshold for the first memory device and/or the second memory device has not been exceeded, then at block 340, subsequent data is stored at the first memory device or the second memory device. The subsequent data can be received from a host system for storage by the memory system. In one embodiment, if the usage thresholds for the memory devices have not been exceeded, the subsequent data can be stored at the first memory device or second memory device based on characteristics associated with the subsequent data. Further detail with regards to storing data based on characteristics associated with the data will be discussed below.

At block 350, if a usage threshold of the first memory device and/or the second memory device has been exceeded, the subsequent data is not stored at the memory device that corresponds to the exceeded usage threshold. For example, if it is determined that the usage threshold for the first memory device has not been exceeded and the usage threshold for the second memory device has been exceeded, then subsequent data is not stored at the second memory device (e.g., the memory device corresponding to the exceeded usage threshold). As previously described, in one embodiment, the usage thresholds can correspond to the endurance of memory devices to reliably store data. Accordingly, the usage threshold of a memory device being exceeded can indicate that the memory device can no longer store data reliably and, therefore, subsequent data should no longer be stored at the memory device. In one embodiment, if the usage threshold of the memory device is exceeded, the memory device can begin to operate in a read-only mode. While operating in a read-only mode, data stored at the memory device can continue to be read (e.g., provided to the host system), but subsequent data received from the host system is not stored at the memory device.

At block 360, a notification is generated for a host system that is associated with the memory device that exceeded the usage threshold at block 330. Upon generation of the notification, the notification can be provided to the host system associated with the memory device. The notification can identify that the usage of a particular memory device has exceeded a corresponding usage threshold. For example, the notification can identify that the usage of the second memory device has exceeded the usage threshold of the second memory device. In one embodiment, the usage of a memory device can correspond to a number of bytes written to a memory cell of a memory device. For example, the usage of the first memory device can correspond to 1,000,000 bytes of data written to a memory cell of the first memory device. In embodiments, the usage of a memory device can correspond to a number of write operations performed on a memory cell of a memory device. In one embodiment, the notification can include a prompt for a remedial action to be performed on the memory device having the exceeded usage threshold. For example, the notification can include a prompt for placing the memory device in a read-only mode.

In embodiments where a memory device has multiple usage thresholds, a notification can be sent for each of the multiple usage thresholds. The notifications can include information corresponding to their associated usage thresholds. In embodiments, the notifications can include different prompts for remedial actions to be performed with regards to the memory device. For example, a memory device can have one usage threshold at 900,000 total bytes written to a memory cell of the memory device and another usage threshold at 1,000,000 total bytes written to the memory cell of the memory device, where 1,000,000 total bytes written corresponds to a point where the memory device can no longer reliably store data. Upon the number of bytes written to the memory cell of the memory device exceeding the usage threshold of 900,000 total bytes written to the memory cell, a notification can be generated indicating that the memory device is approaching a point where the memory device can no longer reliably store data. The notification can also include a prompt for a remedial action. For example, the notification can prompt a user of the host system to replace the memory device. Upon the number of bytes written to the memory cell of the memory device exceeding the usage threshold of 1,000,000 total bytes written to the memory cell, another notification can be generated indicating that the memory device has reached a point where the memory device can no longer reliably store data. In embodiments, the other notification can include a prompt to place the memory device into a read-only mode.

Figure 4A:
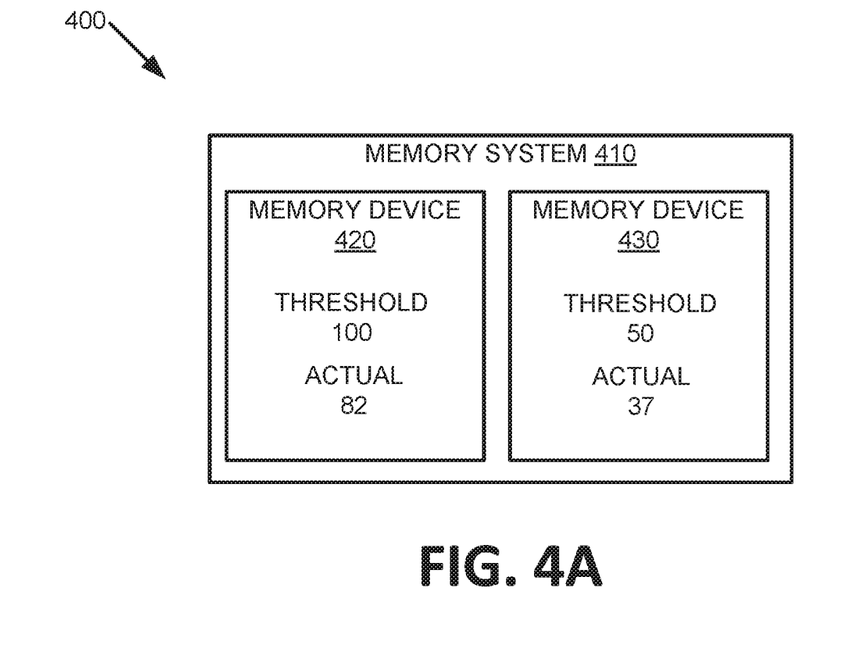
FIG. 4A illustrates an example of determining whether to store data at a memory device based on the usage of the memory device in accordance with some embodiments of the present disclosure.

FIG. 4A illustrates an example of determining whether to store data at a memory device based on the usage of the memory devices 400, in accordance with some embodiments of the present disclosure. Memory system 410 includes memory devices 420 and 430. In one embodiment, memory device 420 includes a first media type having a first endurance to store data and memory device 430 includes a second media type having a second endurance to store data. For illustrative purposes, memory device 420 has a usage threshold of 100 and memory device 430 has a usage threshold of 50. In one embodiment, the usage thresholds and actual usages can correspond to a number of bytes written to a memory cell of the memory device. In embodiments, the usage thresholds and actual usages can correspond to a number of write operations performed on a memory cell of the memory device.

In the present illustration, the actual usage of a memory cell of memory device 420 is 82 write operations performed on a memory cell of memory device 420. Because the actual usage of the memory cell (e.g., 82 write operations) of memory device 420 is less than the usage threshold (e.g., 100 write operations) for memory device 420, data can be stored at memory device 420. The actual usage of a memory cell of memory device 430 is 37 write operations performed on a memory cell of memory device 430. Because the actual usage of the memory cell (e.g., 37 write operations) is less than the usage threshold (e.g., 50 write operations) for memory device 430, data can be stored at memory device 430.

Figure 4B:
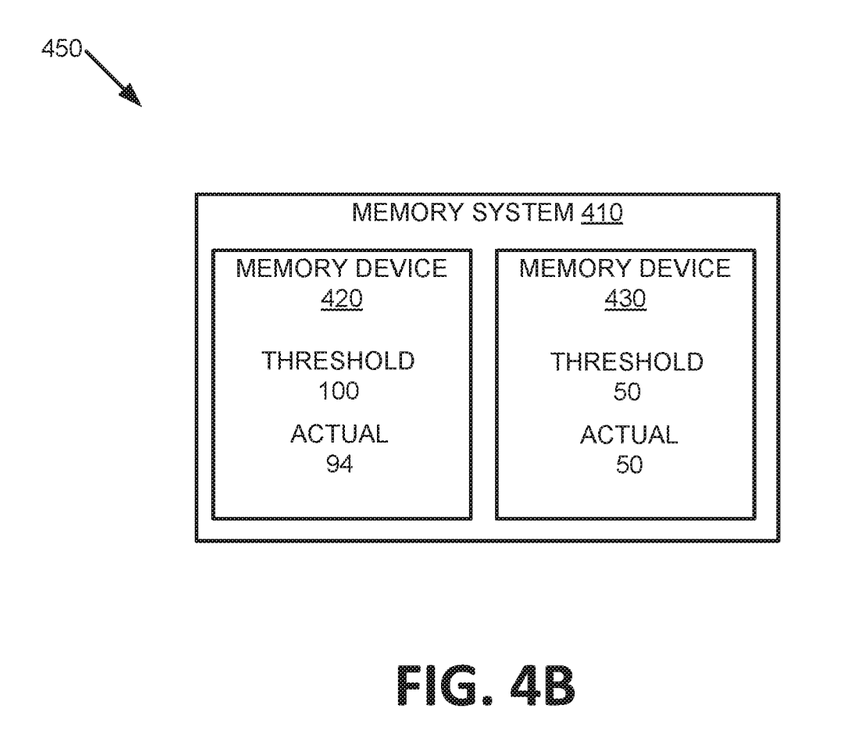
FIG. 4B illustrates an example of determining whether to store other data at a memory device based on the usage of the memory device in accordance with some embodiments of the present disclosure.

FIG. 4B illustrates an example of determining whether to store other data at a memory device based on the usage of the memory devices 450, in accordance with embodiments of the present disclosure. In the present illustration, the actual usage of a memory cell of memory device 420 is 94 write operations performed on a memory cell of memory device 420. Because the actual usage of the memory cell of memory device 420 is less than the usage threshold (e.g., 100 write operations) for memory device 420, data can be stored at the memory cell of the memory device 420. The actual usage of a memory cell of memory device 430, however, is 50 write operations performed on a memory cell of memory device 430. Because the actual usage of the memory cell (e.g., 50 write operations) exceeds the usage threshold (e.g., 50) for memory device 430, data is not stored at the memory cell of memory device 430.

Figure 5:
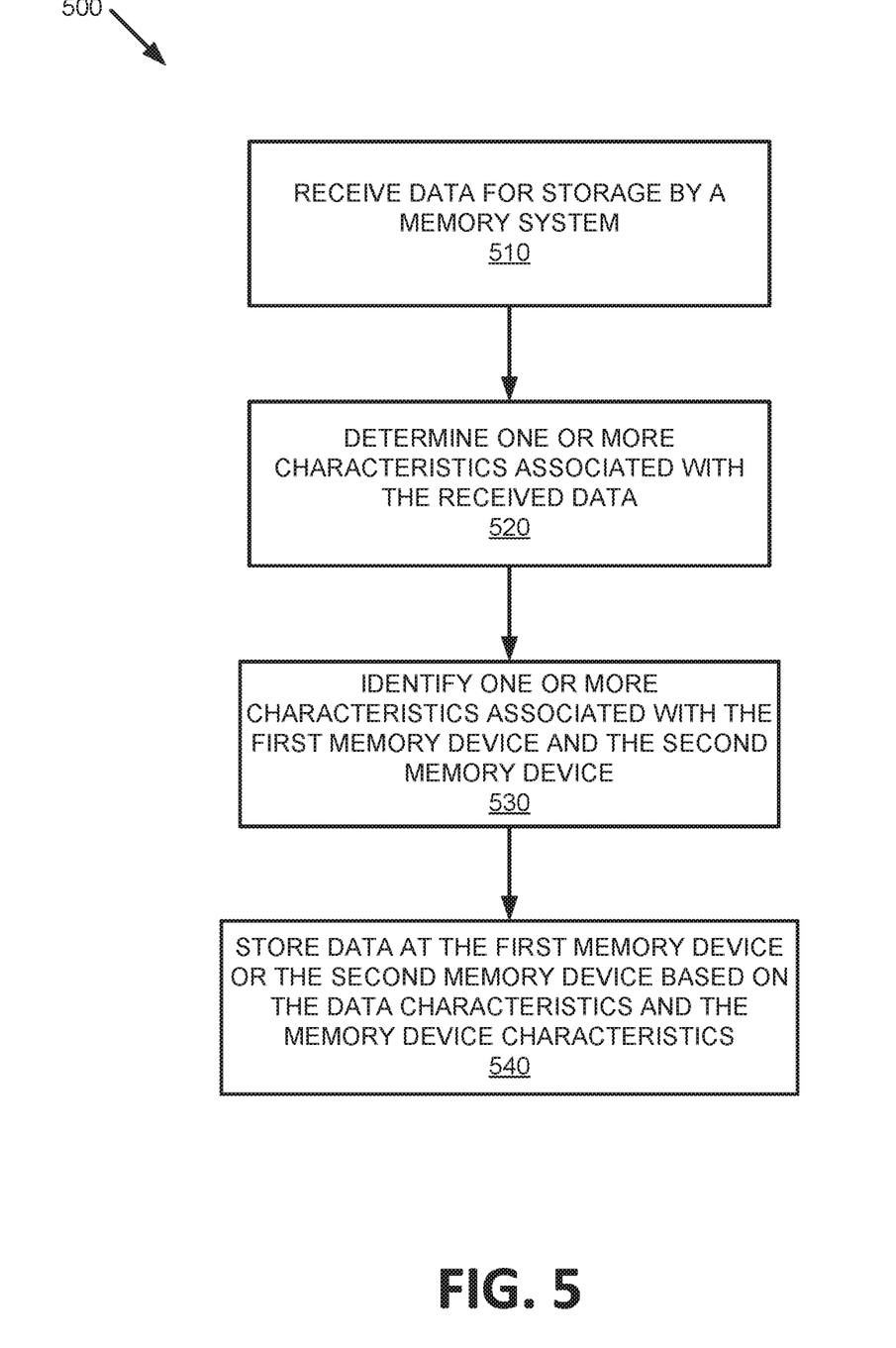
FIG. 5 is a flow diagram of an example method to store data at a memory device of a memory system based on characteristics associated with the data in accordance with some embodiments of the present disclosure.

FIG. 5 is a flow diagram of an example method 500 to store data at a memory device of a memory system based on characteristics associated with the data, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the memory characteristic component 113 of FIG. 1.

At block 510, data is received for storage by a memory system. The data can be received from a host system for storage at a memory device of the memory system. At block 520, one or more characteristics associated with the data received at block 510 are determined. Examples of characteristics associated with the data are amount of data (e.g., number of bits of data to be stored), access frequency (e.g., how often the data is accessed from the memory system), write operation frequency (e.g., how often data is written and/or erased), and the like.

At block 530, one or more characteristics associated with a memory device and a second memory device is identified. The characteristics can be identified from the first set of characteristics associated with the first memory device and the second set of characteristics associated with the second memory device. The one or more characteristics can be associated with the endurance of the respective memory devices.

At block 540, data is stored at the first memory device or the second memory device based on the characteristics associated with the data and the characteristics associated with the first memory device and the second memory device. For example, if the data received at block 510 is determined to correspond to a large amount of data, then the data can be stored at the memory device (e.g., the first memory device of the second memory device) having a higher data density. In another example, if the data is determined to have a high access frequency, then the data can be stored at the memory device having a higher access speed. In a further example, if the data is determined to have a high write operation frequency, then the data can be stored at the memory device having a higher endurance to store data. In some embodiments, data can be stored at the first memory device or the second memory device based on the determined characteristics of the received data as well as corresponding usage thresholds. For example, data can be stored at the first memory cell or second memory cell based on determined characteristics associated with the data, as described above. However, upon a usage threshold of a memory device being exceeded, subsequent data is no longer stored on the memory device even if the memory device has the desired characteristics for the subsequent data.

Figure 6:
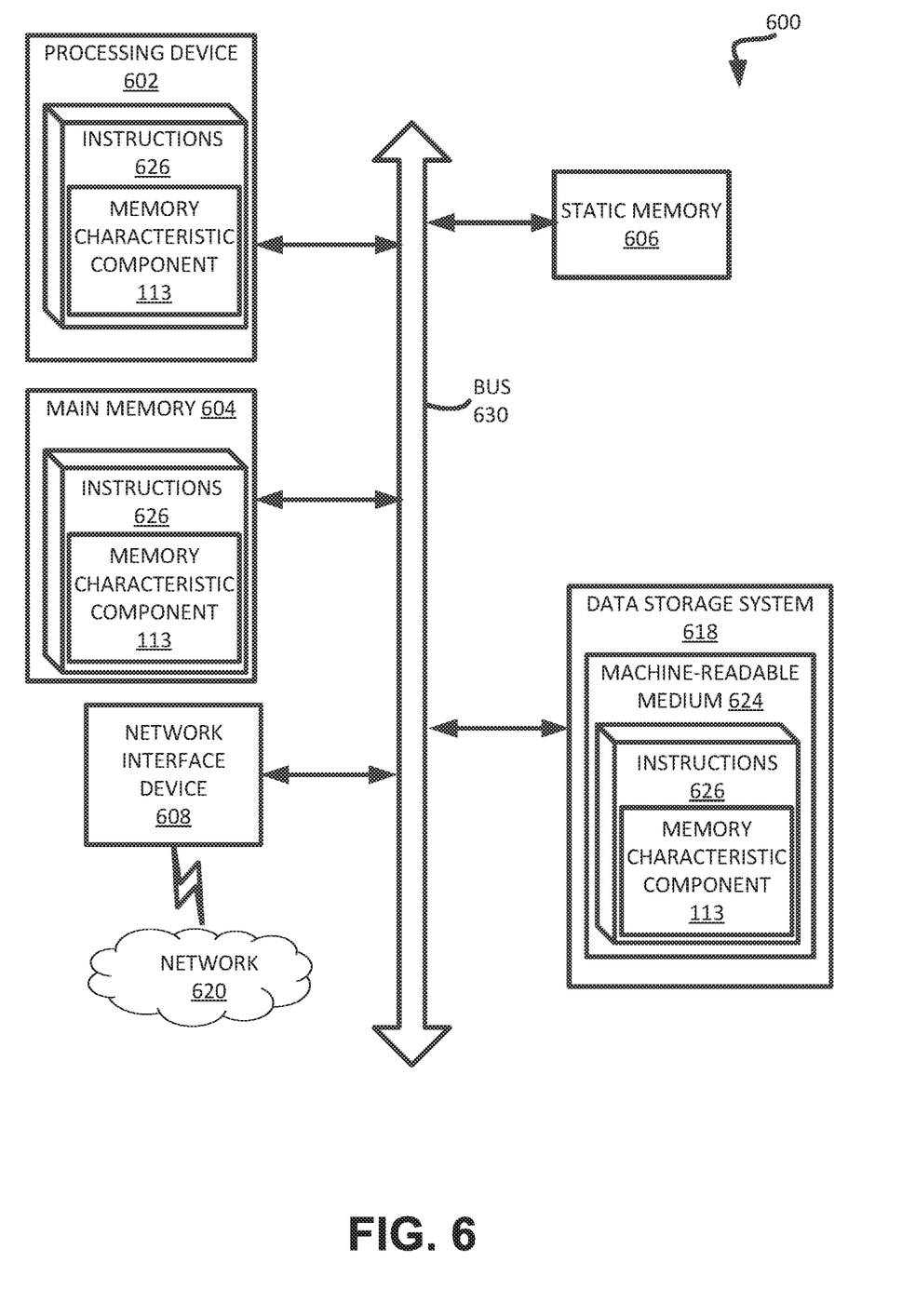
FIG. 6 is a block diagram of an example computer system in which implementations of the present disclosure may operate.

FIG. 6 illustrates an example machine of a computer system 600 within which a set of instructions, for causing the machine to perform any one or more of the methodologies discussed herein, can be executed. In some implementations, the computer system 600 can correspond to a host system (e.g., the host system 120 of FIG. 1) that includes or utilizes a memory system (e.g., the memory system 110 of FIG. 1) or can be used to perform the operations of a controller (e.g., to execute an operating system to perform operations corresponding to the memory characteristic component 113 of FIG. 1). In alternative implementations, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions or software 626 embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory system 110 of FIG. 1.

In one implementation, the instructions 626 include instructions to implement functionality corresponding to a memory characteristic component (e.g., the memory characteristic component 113 of FIG. 1). While the machine-readable storage medium 624 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   receiving a first set of characteristics corresponding to a first memory device of a plurality of memory devices and a second set of characteristics corresponding to a second memory device of the plurality of memory devices;
   determining a first usage threshold for the first memory device based on the first set of characteristics and a second usage threshold for the second memory device based on the second set of characteristics, the first usage threshold and the second usage threshold having different threshold values and associated with a same type of usage for the first memory device and the second memory device;
   receive data for storage from a host system coupled to the system;
   in response to determining that the first usage threshold is greater than a respective usage of the first memory device and the second usage threshold is greater than a respective usage of the second memory device, determine whether to store the data at the first memory device or the second memory device based on at least one of one or more characteristics of the data or a relative magnitude of the first usage threshold to the second usage threshold;
   storing, by a processing device, data at the first memory device or the second memory device based on the at least one of the one or more characteristics of the data or the relative magnitude of the first usage threshold to the second usage threshold; and
   in response to determining that the respective usage of the first memory device exceeds the first usage threshold:
      refraining from storing subsequent data to the first memory device; and
      operating the first memory device in a read-only mode by performing read operations on data stored at the first memory device.

2. The method of claim 1, wherein the first usage threshold corresponds to a first endurance of the first memory device to store the data and wherein the second usage threshold corresponds to a second endurance of the second memory device to store the data.

3. The method of claim 1, further comprising:
   determining whether a first usage of the first memory device exceeds the first usage threshold or a second usage of the second memory device exceeds the second usage threshold; and
   in response to determining that the first usage of the first memory device exceeds the first usage threshold or the second usage of the second memory device exceeds the second usage threshold, providing a notification to a host system associated with the plurality of memory devices that identifies the first usage of the first memory device exceeding the first usage threshold or the second usage of the second memory device exceeding the second usage threshold.

4. The method of claim 1, further comprising:
   determining that a first usage of the first memory device exceeds the first usage threshold; and
   in response to determining that the first usage of the first memory device exceeds the first usage threshold, determining to not store subsequent data to the first memory device, wherein the subsequent data is stored at the second memory device.

5. The method of claim 1, wherein the first set of characteristics comprise data density, access speed, a number of total bytes written or a number of write operations performed with respect to the first memory device and wherein the second set of characteristics comprise data density, access speed, a number of total bytes written or a number of write operations performed with respect to the second memory device.

6. The method of claim 1, further comprising:
   transmitting a request for sets of characteristics for each memory device of the plurality of memory devices, wherein to receive the first set of characteristics corresponding to the first memory device of the plurality of memory devices and the second set of characteristics corresponding to the second memory device of the plurality of memory devices is in response to transmitting the request for the sets of characteristics for each memory device of the plurality of memory devices.

7. The method of claim 1, wherein the first memory device is different than the second memory device and wherein an endurance of the first memory device to store data is different than an endurance of the second memory device to store data.

8. A non-transitory computer-readable storage medium comprising instructions that, when executed by a processing device, cause the processing device to:
   receive a first set of characteristics corresponding to a first memory device of a plurality of memory devices and a second set of characteristics corresponding to a second memory device of the plurality of memory devices;
   determine a first usage threshold for the first memory device based on the first set of characteristics and a second usage threshold for the second memory device based on the second set of characteristics, the first usage threshold and the second usage threshold having different threshold values and associated with a same type of usage for the first memory device and the second memory device;
   receive data for storage from a host system coupled to the system;
   in response to determining that the first usage threshold is greater than a respective usage of the first memory device and the second usage threshold is greater than a respective usage of the second memory device, determine whether to store the data at the first memory device or the second memory device based on at least one of one or more characteristics of the data or a relative magnitude of the first usage threshold to the second usage threshold;
   store data at the first memory device or the second memory device based on the at least one of the one or more characteristics of the data or the relative magnitude of the first usage threshold to the second usage threshold; and
   in response to determining that the respective usage of the first memory device exceeds the first usage threshold:
      refrain from storing subsequent data to the first memory device; and operate the first memory device in a read-only mode by performing read operations on data stored at the first memory device.

9. The non-transitory computer-readable storage medium of claim 8, wherein the first usage threshold corresponds to a first endurance of the first memory device to store the data and wherein the second usage threshold corresponds to a second endurance of the second memory device to store the data.

10. The non-transitory computer-readable storage medium of claim 8, wherein the processing device is further to:
determine whether a first usage of the first memory device exceeds the first usage threshold or a second usage of the second memory device exceeds the second usage threshold; and
in response to determining that the first usage of the first memory device exceeds the first usage threshold or the second usage of the second memory device exceeds the second usage threshold, provide a notification to a host system associated with the plurality of memory devices that identifies the first usage of the first memory device exceeding the first usage threshold or the second usage of the second memory device exceeding the second usage threshold.

11. The non-transitory computer-readable storage medium of claim 8, wherein the processing device is further to:
determine that a first usage of the first memory device exceeds the first usage threshold; and
in response to determining that the first usage of the first memory device exceeds the first usage threshold, determine to not store subsequent data to the first memory device, wherein the subsequent data is stored at the second memory device.

12. The non-transitory computer-readable storage medium of claim 8, wherein the processing device is further to:
transmit a request for sets of characteristics for each memory device of the plurality of memory devices, wherein to receive the first set of characteristics corresponding to the first memory device of the plurality of memory devices and the second set of characteristics corresponding to the second memory device of the plurality of memory devices is in response to transmitting the request for the sets of characteristics for each memory device of the plurality of memory devices.

13. A system comprising:
a plurality of memory devices; and
a processing device, operatively coupled with the plurality of memory devices, to:
receive a first set of characteristics corresponding to a first memory device of the plurality of memory devices and a second set of characteristics corresponding to a second memory device of the plurality of memory devices;
determine a first usage threshold for the first memory device based on the first set of characteristics and a second usage threshold for the second memory device based on the second set of characteristics, the first usage threshold and the second usage threshold having different threshold values and associated with a same type of usage for the first memory device and the second memory device;
receive data for storage from a host system coupled to the system;
in response to determining that the first usage threshold is greater than a respective usage of the first memory device and the second usage threshold is greater than a respective usage of the second memory device, determine whether to store the data at the first memory device or the second memory device based on at least one of one or more characteristics of the data or a relative magnitude of the first usage threshold to the second usage threshold;
store data at the first memory device or the second memory device based on the at least one of the one or more characteristics of the data or the relative magnitude of the first usage threshold to the second usage threshold; and
in response to determining that the respective usage of the first memory device exceeds the first usage threshold:
refrain from storing subsequent data to the first memory device; and
operate the first memory device in a read-only mode by performing read operations on data stored at the first memory device.

14. The system of claim 13, wherein the first usage threshold corresponds to an endurance of the first memory device to store the data and wherein the second usage threshold corresponds to an endurance of the second memory device to store the data.

15. The system of claim 13, wherein the processing device is further to:
determine whether a first usage of the first memory device exceeds the first usage threshold or a second usage of the second memory device exceeds the second usage threshold; and
in response to determining that the first usage of the first memory device exceeds the first usage threshold or the second usage of the second memory device exceeds the second usage threshold, provide a notification to a host system associated with the plurality of memory devices that identifies the first usage of the first memory device exceeding the first usage threshold or the second usage of the second memory device exceeding the second usage threshold.

16. The system of claim 13, wherein the processing device is further to:
determine that a first usage of the first memory device exceeds the first usage threshold; and
in response to determining that the first usage of the first memory device exceeds the first usage threshold, determine to not store subsequent data to the first memory device, wherein the subsequent data is stored at the second memory device.

17. The system of claim 13, wherein the first set of characteristics comprise data density, access speed, a number of total bytes written or a number of write operations performed with respect to the first memory device and wherein the second set of characteristics comprise data density, access speed, a number of total bytes written or a number of write operations performed with respect to the second memory device.

18. The system of claim 13, wherein the processing device is further to:
transmit a request for sets of characteristics for each memory device of the plurality of memory devices, wherein to receive the first set of characteristics corresponding to the first memory device of the plurality of memory devices and the second set of characteristics corresponding to the second memory device of the plurality of memory devices is in response to transmitting the request for the sets of characteristics for each memory device of the plurality of memory devices.

19. The system of claim 13, wherein the first memory device is different than the second memory device and wherein a first endurance of the first memory device to store data is different than a second endurance of the second memory device to store data.

20. The system of claim 13, wherein the first memory device is a flash based memory and the second memory device is a non-flash based memory.

* * * * *